(12) United States Patent
Radford et al.

(10) Patent No.: US 6,600,509 B1
(45) Date of Patent: Jul. 29, 2003

(54) DETECTION SYSTEM

(75) Inventors: Charles J. Radford, Malvern (GB);
Raymond G. White, Malvern (GB);
Robert W M Smith, Malvern (GB);
John T. Savage, Malvern (GB); John T. O'Connor, Malvern (GB); Philip J. Kent, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/194,207

(22) PCT Filed: Aug. 7, 1997

(86) PCT No.: PCT/GB97/02215

§ 371 (c)(1),
(2), (4) Date: Nov. 20, 1998

(87) PCT Pub. No.: WO98/07118

PCT Pub. Date: Feb. 19, 1998

(30) Foreign Application Priority Data

Aug. 8, 1996 (GB) ............................................... 9616686

(51) Int. Cl.⁷ .............................. H04N 7/18; H04N 9/47
(52) U.S. Cl. ....................................... 348/143; 382/154
(58) Field of Search ................................. 382/154, 115, 382/103; 377/6; 340/556; 356/5.1; 348/143

(56) References Cited

U.S. PATENT DOCUMENTS

| 4,653,316 A | * | 3/1987 | Fukuhara ..................... 73/146 |
| 4,679,076 A | | 7/1987 | Vikterloef |
| 4,742,337 A | * | 5/1988 | Haag ........................... 340/556 |
| 5,138,638 A | | 8/1992 | Frey |
| 5,255,301 A | * | 10/1993 | Nakamura ..................... 377/6 |
| 5,305,390 A | * | 4/1994 | Frey ............................. 382/2 |
| 5,790,243 A | * | 8/1998 | Herr ........................... 356/5.1 |
| 5,987,154 A | * | 11/1999 | Gibbon ....................... 382/115 |
| 6,044,170 A | * | 3/2000 | Migdal ....................... 382/154 |

FOREIGN PATENT DOCUMENTS

| DE | 2100280 | 7/1972 |
| EP | 0174549 | 3/1986 |
| EP | 0286831 | 10/1988 |
| EP | 0700017 | 3/1996 |

\* cited by examiner

*Primary Examiner*—Chris Kelley
*Assistant Examiner*—Charles Parsons
(74) *Attorney, Agent, or Firm*—Nixon & Vanderhye P.C.

(57) ABSTRACT

A detection system (10) utilising projected light (18, 20) viewed through an appropriately placed camera (22) detects variations in surface height (26). The system (10) is arranged to project light onto the surface (16) of interest. A camera with optical axis (24) oriented parallel to and offset from the direction of light projection is used to image the intersection (50, 66) of the projected light (18, 20) with the surface (16). The system (10) observes deflections (64) of this imaged intersection (66) and associates them with the movement of an object (26, 124) through the projected light. The object can range from a surface irregularity (124) to a person (26) walking along a corridor.

3 Claims, 5 Drawing Sheets

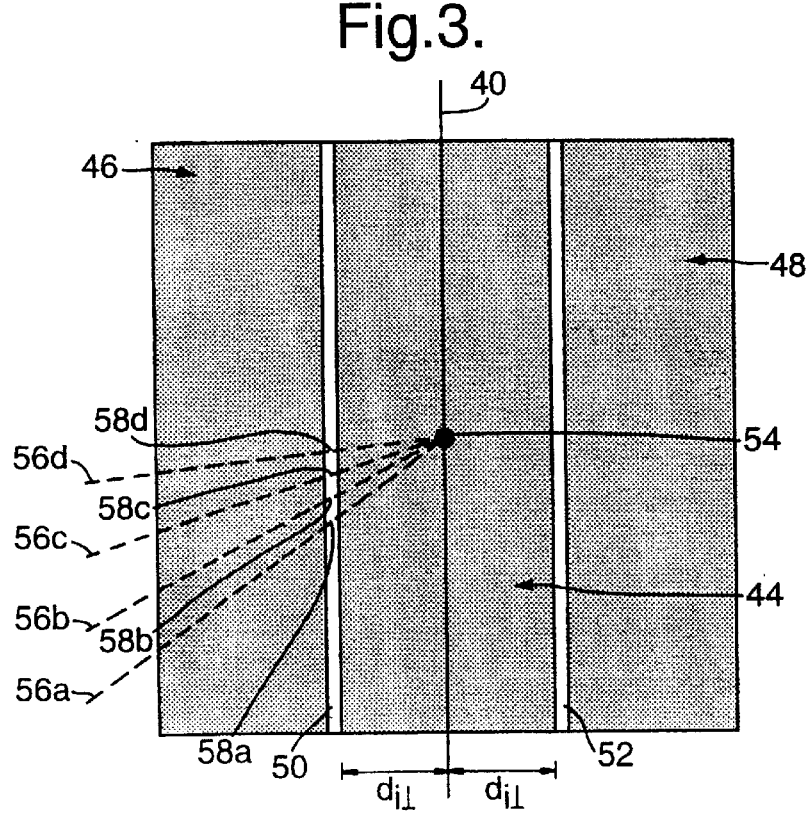
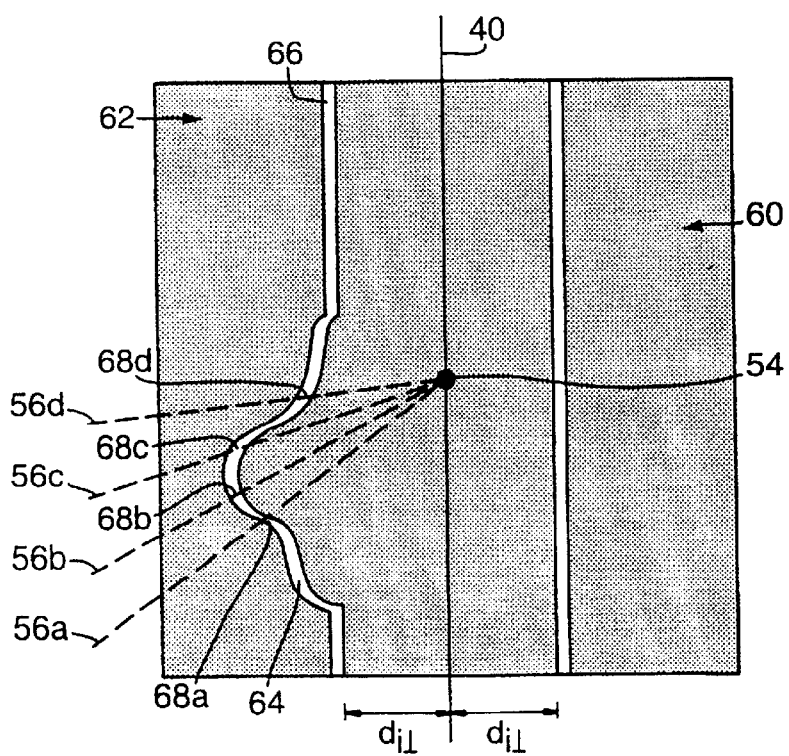

DETECTION SYSTEM

BACKGROUND OF THE INVENTION

1. Field of the Invention

The problem of building security is an important issue currently being addressed by developing technology. Automatic counting mechanisms for determining and/or controlling the number or identity of people passing through a particular entrance or exit have been around for some time. They vary from the simple automatic turnstile to swipe card access and radio-frequency tagging systems. A principal disadvantage of all these previous techniques is the low access speed. An automatic turnstile is particularly obstructive in requiring considerable effort to be made by moving personnel. None of the systems can be operated with a default unlocked door making a locking/unlocking mechanism unavoidable. In swipe card systems such door mechanisms are prone to failure. Radio-frequency tagging doesn't detect untagged intruders and so cannot be used to maintain a default unlocked system.

There is a perceived need for a detection system capable of monitoring personnel movement which provides for a faster throughput of traffic.

SUMMARY OF THE INVENTION

It is an object of this invention to provide a detection system capable of providing non-intrusive monitoring of personnel movement through default unlocked entry and exit points.

The present invention provides a detection system including a light source arranged to project light onto an obstructing surface and imaging means arranged to selectively image the intersection of the projected light with the obstructing surface characterised in that the imaging means comprises at least one camera sensitive to light emitted from said light source and the imaging means and light source are mutually arranged such that the orientation of imaging means optical axis and direction of light projection from said source are parallel or intersect at a position on the opposite side of the obstructing surface to the imaging means and source of projected light.

The invention provides the advantage of non-intrusive detection. It exploits the effects of perspective on objects when viewed from a particular direction: an object interrupting such projected light can be readily detected as an outward movement of an imaged intersection in the field of view. It thus allows for the detection of object movement through the system without obstruction of the traffic flow.

The system is preferably arranged to monitor the presence or absence of bodies on a bounding surface intersecting the projected light. In this regard, the bounding surface forms the obstructing surface in the absence of a body; and the surface of the body forms the obstructing surface in the presence of a body. The imaged intersection then has different positions according to whether it arises from the bounding surface or the surface of the body and these positions are relatively displaced in accordance with the body surface's remoteness from the bounding surface. This provides the advantage of simplicity in application of the invention to numerous situations. The intersection of the projected light with a surface can be imaged and that image monitored continuously. Movement of the image can be ascribed to an object on the surface passing through the projected light. The necessary movement may be provided by the object itself, motion of a level surface supporting the object or by movement of the light sheets and imaging means across a stationary surface and objects. Moreover, the objects need not be physically separable from the surface the invention can be used to map the structure of the surface itself.

The projected light is preferably in the form of a substantially planar sheet of light and the imaging means is arranged such that its optical axis is substantially parallel to and offset from the plane of the light sheet. This improves the detection capability of the system. The intersection with a level surface will thus be a bright line which will form a well defined image. Any object crossing this bright line anywhere along its length will cause a deflection in the image. Furthermore the narrowness of the line improves the capability of the system in its provision of accurate information regarding the height of an interrupting object.

The projected light may be in the form of two substantially parallel planar sheets of light disposed about the imaging means and the imaging means arranged such that its optical axis is substantially parallel to the planes of the light sheets. This provides the capability for determining direction of travel through the system by means of observing the sequence of light sheet disturbance.

The imaging means may be arranged to form an image of an intersection of the obstructing surface and a light sheet wherein the intersection is detectable as a line in the image. The system may be arranged to respond to a deflection of such an image line. This provides an improvement to utility. The system is capable of responding to the data received and the need for manual interpretation is reduced.

The system may be arranged to monitor the profile of bodies on a bounding surface intersecting a projected light sheet. In the presence of a body, the surface of the body forms the obstructing surface and the image line defines a deflection pattern characteristic of the profile of the body. This increases the information available to the detection system and renders it capable of more sophisticated responses.

The deflection pattern may comprise perpendicular displacements of image line components from their original positions in the line. The displacements ($d_{shift1}$) measured at the image plane of the imaging means are described by the equation $$d_{shift\perp} = fd_\perp \frac{h_{body}}{h_c(h_c - h_{body})}$$

where $d_\perp$ is the perpendicular distance from the imaging means to the light sheet responsible for the line in the image, f is the focal length of the imaging means, $h_c$ is the distance between the imaging means and the bounding surface and $h_{body}$ is a parameter describing the body height at each point that it intersects the light sheet. This provides a straightforward means of deriving the profile of an interrupting object from the deflection pattern observed as the object passes through a light sheet.

The projected light may be directed transversely of a longitudinally extending transit zone, and projected from a bounding region in which the imaging means is located. This provides for complete coverage across the transit zone and the system is therefore capable of detecting any object moving along it. In one embodiment the transit zone may be a corridor, the obstructing surface is the corridor floor or the surface of a body and the bounding region is the corridor ceiling. This provides a detection system which is capable of monitoring personnel movement into and out of a designated room or area of a building.

The imaging means may be a single camera or a one-dimensional array of at least two cameras, the array alignment being substantially perpendicular to the component cameras' optical axes and substantially parallel to the plane of the projected light. A single camera provides the advantage of cost reduction but an array will allow imaging along the length of the light sheets without demanding an extensive single camera field of view. Furthermore the array also provides an improvement in accurate counting. A single camera could find its view of one body obscured by a second, nearer body. This is particularly likely to occur if the second body is taller than the first. The effects of such obscuration are largely overcome by the use of a number of cameras as any one body will be imaged in at least one camera.

The light source may be at least one strip source extending longitudinally along one side of each light sheet. Alternatively, it may comprise an array of point sources for each sheet such that the array is located along one side of each light sheet and arranged to project light to the opposite side of the respective light sheet. Each point source may be associated with a cylindrical lens and thereby arranged to project light fanned within the plane of the respective light sheet. A strip source provides the advantage of security. Objects passing through the light sheet will disturb the light regardless of their position within the sheet. It also enables a profile of the object to be derived from the deflection pattern without interpolation. Fanning an array of collimated point sources will also enable complete transverse coverage, and this implementation is more cost effective. An unfanned collimated array will require more sources in order to achieve effective transverse coverage but it does reduce the problems of potential obscuration. In the fanned case, light may be blocked from illuminating a body by a second, closer body. Furthermore, using an unfanned collimated array simplifies both the computation associated with the invention and the implementation of its optics. With such a collimated array the projected light is imaged as a series of two-dimensional dots as opposed to a line. The locus of deflection of each dot is known and so only a limited number of pixels need to be searched in locating the deflection pattern. Moreover, a dot exhibits a two-dimensional intensity profile which increases the reliability of its detection.

The imaging means may be focused on a plane located within a height range 1.6 m to 2.0 m above the floor. This range is the average human height and so this feature enhances the focus of the deflection pattern in any implementation for which the system detects human traffic.

The imaging means is preferably connected to a data processing system responsive to the form and/or change in the image formed by the imaging means. This provides the system with a powerful capability to interpret and react to data received from the imaged intersections.

The data processing system may be arranged to respond with a count each time a deflection of the image line occurs. In embodiments employing two sheets of light, the data processing system is arranged to associate a deflection of one image line from a first position in the image to another position with a subsequent deflection of the other image line for the purpose of determining direction of travel of the body causing said deflections and further arranged to respond with a count on the occurrence of such a pair of deflections. In this way the system is capable of keeping an account of the number of personnel occupying a designated area guarded by the detection system of the invention. This is advantageous to the use of the system in secure or restricted access buildings.

A first deflection of one image line may be associated with a deflection of the other image line which occurs most immediately after the first deflection. Or, a deflection of one image line may be associated with a deflection of the other image line which occurs nearest to a predetermined time after the first deflection. These embodiments provide methods of association which are not particularly demanding of computing power in their application. Alternatively, the data processing system may be arranged to apply pattern matching techniques to match a deflection pattern at one image line with a deflection pattern at the other image line and thereby to associate said two deflections. This provides an increase in accuracy while monitoring two-directional flow of traffic. A body is not counted until its profile is registered first at one image line and then at the other.

The data processing system includes an image processor arranged to record, process and digitise the deflection pattern, a counting unit arranged to count the number of such deflection patterns occurring in each light sheet, an interpreter arranged to associate disturbances arising from the same body passing through both light sheets and a memory arranged to provide data to the interpreter. This provides a straightforward example of a data processing system suitable for implementation with the projected light detection apparatus which monitors the number of individuals passing through and direction of travel of each.

The data processing system may be arranged to compare a multiple-body deflection pattern occurring at an image line with stored deflection patterns, each stored deflection pattern being characteristic of a single causative body, and thereby to be capable of resolving the unknown deflection pattern into a number of overlapping single-body deflection patterns. This provides the advantage of increased flexibility by rendering the system adaptable to use in situations of high traffic flow.

The data processing system includes updatable storage means arranged to monitor the population within a designated area in accordance with the number of bodies passing through the detection system of the invention and the direction of travel deduced by association of deflections of different image lines, and wherein the number of single-body deflection patterns resolved from the multiple-body deflection patterns is equivalent to the number of bodies passing through a light sheet and therefore entering or leaving the designated area. This combines the advantages of constant monitoring of the population of a restricted area with the flexibility of adaptation for a high volume of traffic flow.

In a further embodiment, the detection system may be arranged to monitor the presence or absence of irregularities on a surface. In this embodiment, in the absence of an irregularity, the surface forms the obstructing surface; and in the presence of an irregularity, the surface of the irregularity forms the obstructing surface. The imaged intersection thus has different positions according to whether it arises from the surface or the irregularity and these positions are relatively displaced in accordance with the height or depth of the irregularity on the surface. This embodiment provides a further application of the invention: examination of a surface for damaging irregularities. Specifically, the surface may be a road surface. The light source and imaging means may be located on the underside of a road vehicle, the light source being arranged to project light in at least one light sheet onto the road surface and the imaging means being arranged to reveal irregularities in the road surface as deflections in an image. Thus roads can be checked with a view to repair before excessive damage is caused.

The light source preferably comprises solid state photoemitters arranged to emit infrared radiation of wavelength less than 1 µm. This provides advantages in security, convenience and accuracy. The projected light will not be visible to the naked eye and so avoids the distraction of permanent lighting. In security systems, this also reduces the likelihood of evasive measures being taken to avoid detection. Furthermore, the system relies on good signal to noise from the projected light striking the body beneath. This requires strong contrast and minimising the effects of ambient lighting is therefore important. Typically, the ambient lighting of buildings does not contain much infrared intensity in the sub-1 µm wavelength range.

A detection system arranged in a body counting implementation may be combined with a recognition system and incorporated into a second detection system. The recognition system is arranged to respond to the presence of predetermined individuals, preferably by detection of a radio-frequency marker tag, and thereby to enable the second detection system either to associate each count recorded by the body-counting detection system with a member of the set of predetermined individuals or to register an intrusion. This system provides security without being obtrusive. It can be operated with a default unlocked door or gate making it very attractive for fast throughput of personnel.

In another aspect, the invention provides a method of detecting objects travelling on a surface comprising the steps of:

(a) projecting at least one sheet of light onto the surface, (b) selectively imaging the intersection of each sheet of light with the surface through imaging means whose optical axis is substantially parallel to the projection direction and offset from the projected light, and (c) detecting deflections of imaged intersections of each projected light sheet.

This invention exploits the effects of perspective when viewing from a particular direction. An object interrupting a light sheet can be readily detected as an outward movement of an imaged intersection in the field of view. It thus provides for non-intrusive detection of movement through the system.

The method may also comprise the steps of:

(a) associating each deflection of an imaged intersection with the passage of an object through the projected light sheet responsible for said imaged intersection, (b) responding to each deflection in accordance with the deflection being caused by the passage of an object through the associated light sheet.

This provides for an appropriate system response to be made to a deflection of an imaged intersection. This response may vary from recording a count to initiating a complex signal processing routine. It therefore confers a utility advantage in increasing the adaptability of the method of the invention to different purposes.

The method may further comprise the steps of:

(a) associating a deflection of one imaged intersection with a subsequent deflection of the other imaged intersection, and (b) counting the number of deflection pairs.

This enables the direction of travel to be determined from the order in which the light sheets are disturbed and a count of interruptions to be kept. This provides the system with the capability for constantly monitoring the population within a designated area.

In another aspect of the invention, a method of detecting surface irregularities comprises the steps of:

(a) projecting at least one sheet of light onto a surface, (b) selectively imaging the intersection of each sheet of light with the surface with imaging means whose optical axis is substantially parallel to the projection direction and offset from the projected light sheet, (c) moving each light sheet and imaging means relative to the surface, and (d) detecting deflections of imaged intersections between each light sheet and the surface.

This aspect exploits the effects of viewing objects in perspective in order to monitor variations in surface height. It is capable not only of merely detecting irregularities but also of determining their structure. Surface size is not a critical issue, the system is able to detect a variation in height down to a limiting relative change in projection distance. Microscopic surface irregularities can be detected although projected light with correspondingly small dimensions will experience greater diffraction and related microscopic effects. Furthermore there is a fundamental limitation to the smallest spot size achievable. Allowance will have to be made for this in a microscopic implementation.

In order that the invention might be more fully understood, embodiments thereof will now be described with reference to the accompanying drawings in which:

BRIEF DESCRIPTION OF THE DRAWING

FIG. 3 is a representation of an image produced by the camera of FIG. 2 in the absence of an object to be detected.

FIG. 4 is a representation of an image produced by the camera of FIG. 2 in the presence of an object to be detected.

DETAILED DISCUSSION OF EMBODIMENTS

Figure 1:
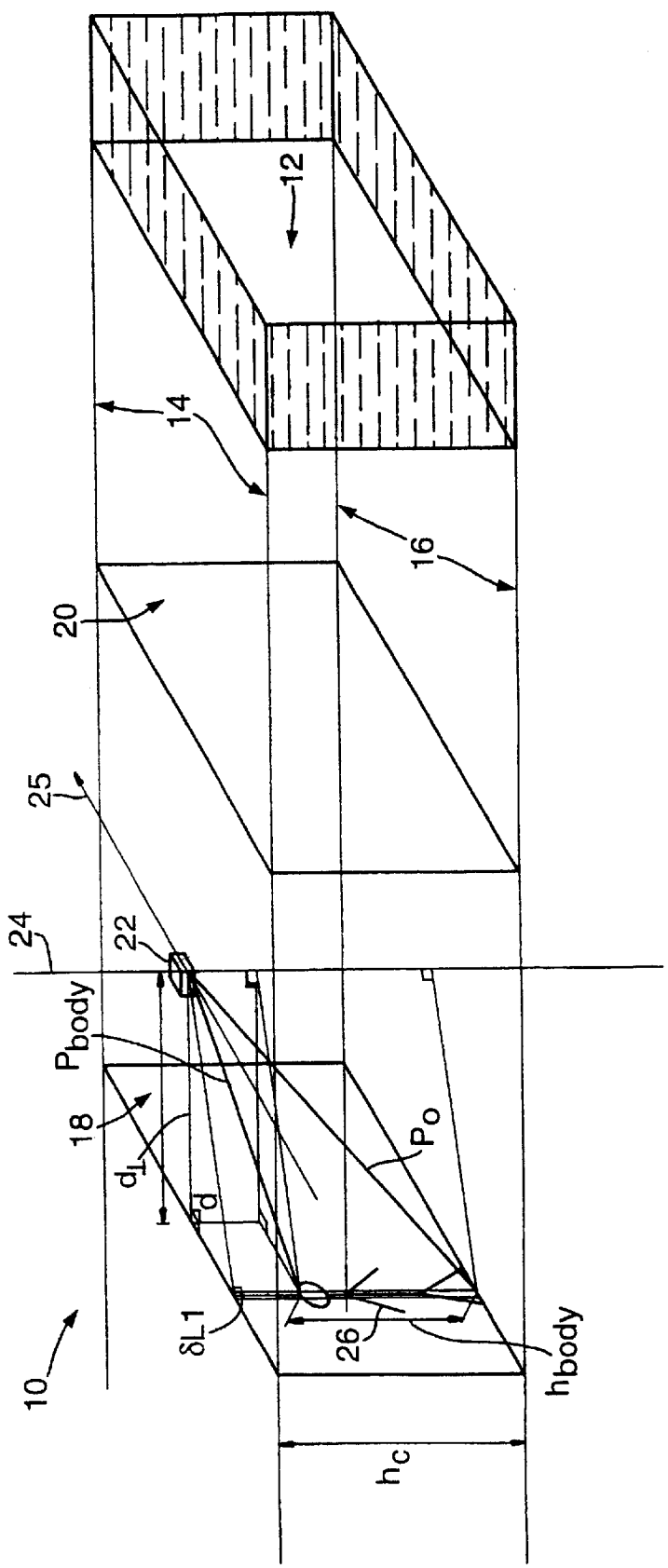
FIG. 1 is a schematic illustration of a detection system of the invention.

With reference to FIG. 1 a detection system of the invention arranged in a body counting implementation is indicated generally by 10. The detection system is located in a corridor 12 which forms an entrance to and/or exit from an area of a building with restricted access requirements. The corridor 12 is of height $h_c$ and has ceiling indicated by lines 14 and a floor indicated by lines 16. The detection system 10 generates first and second parallel sheets of light 18, 20 separated by a distance $2d_1$ and symmetrically disposed about a downward-looking camera 22. Each light sheet 18, 20 is generated by sources (not shown) located on the ceiling 14 which project light onto the floor 16. The light sheets 18, 20 are arranged to cross-section the corridor 12. The camera 22 is located in the ceiling 14 and has an optical axis 24 running perpendicular to the ceiling 14 and floor 16. This arrangement possesses a symmetry plane which intersects with the ceiling 14 along a symmetry line 25. The system 10 is arranged to detect whether or not a body 26 of height $h_{body}$ is or is not positioned within the area of either light sheet 18, 20. In the absence of the body 26, light projected along a thin slice δL1 of the first light sheet 18 is reflected by the floor 16 and follows ray path $P_0$ to form an image in the camera 22. If the first light sheet 18 is interrupted by the body 26 then light projected along the thin slice δL1 is reflected from the head of the body 26 and follows ray path $P_{body}$ to form an image in the camera 22. The distance from the source of the thin slice δL1 to the camera 22, both located in the ceiling 14, is denoted by d.

Figure 2:
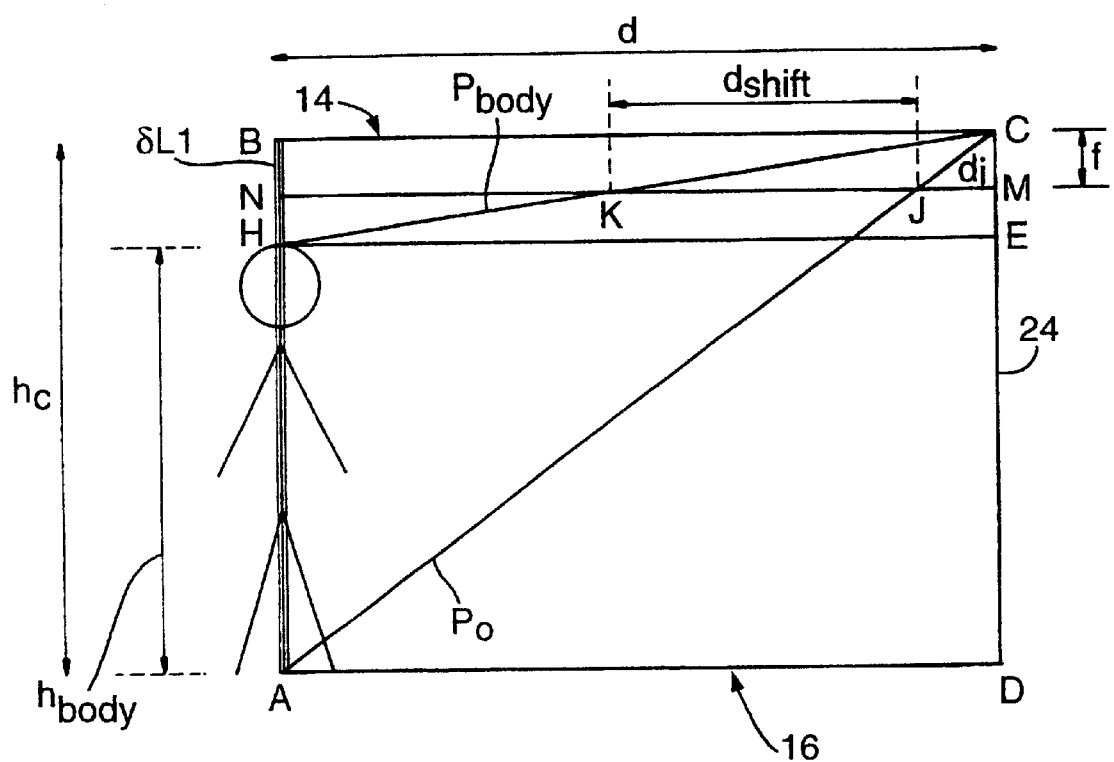
FIG. 2 is a vertical section of FIG. 1 through an object to be detected and a camera in the system of FIG. 1.

It is to be noted that neither FIG. 1 nor FIG. 2 are drawn to scale. Horizontal dimensions have been exaggerated somewhat for clarity. Typically $d_1$ is of the order 0.1 m and $h_c$ is of the order 2.5 m.

FIG. 2 is vertical section of FIG. 1. The section is taken through the camera 22 and the projected light slice δL1 intersecting the body 26. In this Figure objects and distances previously described in relation to FIG. 1 are like referenced. The line δL1 intersects the floor 16 at a point A and the ceiling 14 at a point B. The camera optical axis 24 intersects the ceiling 14 at a point C and the floor 16 at a point D. The distance between points B and C is denoted by d. The tallest point of the body 26 interrupts the slice δL1 of light sheet 18 at a point H. A point E is located at the intersection of the optical axis 24 and a plane parallel to the ceiling 14 passing through point H. The ray line $P_0$ intersects the line HE at point X. The camera 22 forms an image at a plane displaced a distance f from the plane of the ceiling 14. This image plane intersects the camera optical axis 24 at a point M and the slice δL1 at a point N. The intersection of the camera image plane and the planar section shown in this Figure is illustrated by the line NM. Along this line are shown the intersections of the image plane with ray path $P_{body}$ at a point K and with ray path $P_0$ at a point J. The point J is located a distance $d_1$ from the camera axis point M and a distance $d_{shift}$ from point K.

FIG. 3 is a representation of the image formed at the camera 22 by the light sheets 18, 20 viewed in the perspective configuration of FIG. 1 and in the absence of any interrupting body The symmetry line 25 of the system projected onto the image plane of the camera forms a symmetry line 40 which bisects the image plane. The image comprises two bright lines 50, 52 parallel to the symmetry line 40 which define three dark rectangular areas 44, 46, 48. The first and second bright lines 50, 52 are located distances $d_{i1}$ to the left and right respectively of the symmetry line 40 and are the respective images of the first and second light sheets 18, 20. The camera axis 24 passes through a central point 54 of the image. Displacement lines 56a, 56b, 56c, 56d extend radially from the central point 54 and intersect the first bright line 50 at intercept points 58a, 58b, 58c, 58d respectively.

FIG. 4 illustrates schematically the image formed at the camera 22 by the light sheets 18, 20 viewed in the perspective configuration of FIG. 1 when a body 26 interrupts the first light sheet 18. The symmetry line 40, central point 54 and displacement lines 56a, 56b, 56c, 56d of FIG. 3 are represented in this figure and similarly referenced. A first side of the image 60 corresponds to the second light sheet 20 and is unchanged from that of FIG. 3. A second side of the image 62 corresponds to the interrupted first light sheet 18 and this comprises a distortion 64 of a first bright line 66 in the vicinity of the interrupting body 26. Displacement lines 56a, 56b, 56c, 56d extending radially from the central point 54 intersect the bright line 66 at intercept points 68a, 68b, 68c, 68d respectively.

With reference to these figures, the operation of the invention will now be described. The principle of the system is to observe an apparent deflection of a projected beam when an object (body) appears beneath it. This occurs because of the effect of perspective on objects as viewed from above. The fundamental principles will be outlined first and practical details addressed later.

Referring once more to FIG. 1, the two sheets of light 18, 20 are parallel to one another and are projected from the ceiling 14 to the floor 16 of the corridor 12. The camera 22 is located in the ceiling midway between the light sheets 18, 20. The camera field of view encompasses the floor area between the light sheets, the intersection of both light sheets 18, 20 with the floor 16 and part of the floor areas beyond each light sheet 18, 20. The light sheets 18, 20 are thus viewed by the camera 22 in perspective. The image formed by the camera 22 is shown in FIG. 3. Each projected light sheet 18, 20 is imaged as a respective bright line 50, 52, displaced a distance $d_{i1}$ to the left and right of the symmetry line 40 perpendicular to the camera optical axis 54. The area of the floor 16 between the two light sheets 18, 20 thus forms a central dark area 44 of width $2d_{i1}$ in the image. Areas of the corridor 12 beyond the light sheets 18, 20 are seen by the camera 22 through the light sheets 18, 20 and imaged as outer dark areas 46, 48. The relationship between image distance ($d_{i1}$) and the perpendicular distance between the camera 22 and each light sheet 18, 20 ($d_1$) is a function of the geometry and optics of the system. The bright lines 50, 52 correspond to the images of the intersections of the light sheets 18, 20 and the floor 16 and are thus straight parallel lines in the images of uninterrupted light sheets 18, 20.

Referring now to FIGS. 1 to 4, consider a person walking along the corridor 12 and thereby passing through the light sheets 18, 20. There is thus a time at which a body 26 interrupts the projection of the first light sheet 18. In an uninterrupted arrangement, light contained within a slice δL1 of the first light sheet 18 intersects the floor 16 at point A. The image of this point A is produced by light propagating along ray line $P_0$ to a point, say, 58b on the bright line 50. At the instant at which the body 26 interrupts the first light sheet 18, light contained within the slice δL1 no longer intersects the floor 16 but is interrupted at the top of the body's head H. The image formed in this case by the camera 22 is shown in FIG. 4. The end H of slice δL1 is imaged in the camera at a point 68b on the bright line 66 by light propagating along ray line $P_{body}$. In FIG. 4 the bright line 66 corresponds to the bright line 50 of the uninterrupted image shown in FIG. 3. In the interrupted case however the bright line 66 comprises two distinct sections. In a first section the bright line 66 is the image of the intersection of the first light sheet 18 with the floor 16. In a second section 64, the bright line 66 is the image of the light sheet intersection with the body 26 in the region for which the light sheet 18 is prevented from intersecting with the floor 16 by that body 26. The image of the intersection of light within the slice δL1 with an opaque obstruction thus moves when the opaque obstruction is switched from a floor 16 to a body 26. The pattern of this motion can be deduced from the geometry of the set up.

In FIGS. 1 and 2, the distance from the camera 22 to a point B on the ceiling 14 directly above the head H of the body 26 is d. Light rays $P_0$ and $P_{body}$ the slice δL1 of the light sheet 18 which is interrupted by the body 26 and the optical axis 24 of the camera 22 are all coplanar. This plane is defined in the figures by rectangle ABCD. Points E, H, J, K, M and N are also contained within this plane. The object plane is defined by the level of the top of the head H of the body 26 above the floor 16. The projected light line δL1 is reflected at H in the presence of the body 26, follows ray path P$_{body}$ and strikes the camera image plane at point K. If the body is absent, the light line δL1 is reflected at A, follows ray path P$_0$ and strikes the image plane at point J. Thus if a body 26 interrupts projected light line δL1 the image formed at the camera is observed to shift from J to K, a distance d$_{shift}$. This displacement d$_{shift}$ can be found from consideration of similar triangles CMK and CEH:

$$\frac{d_{shift} + d_i}{d} = \frac{f}{h_c - h_{body}} \quad (1)$$

and substituting for $d_i$:

$$\frac{d_i}{d} = \frac{f}{h_c}$$

to yield:

$$d_{shift} = fd \frac{h_{body}}{h_c(h_c - h_{body})}$$

This displacement will be in the direction from J to K i.e. radially outwards from the camera axis 24.

Referring again to FIGS. 3 and 4, possible displacements of various image points are indicated by dashed lines 56a, 56b, 56c, 56d. The lines 56a, 56b, 56c, 56d emanate radially from the centre 54 of the image intersecting the bright line 50 at a series of intercept points 58a, 58b, 58c, 58d. Consider, for example, the point at which light line δL1 intersects the floor 16. This appears in the image at point 58b. If a body 26 then interrupts light line δL1 the image point 58b will be displaced along direction 56b by an amount d$_{shift}$ determined by the height of the body 26.

The body 26 will generally create an extended blockage and neighbouring light lines and image points will also be displaced. An example of such displacements is shown in FIG. 4. Intercept points 58a, 58b, 58c, 58d are displaced to points 68a, 68b, 68c, 68d respectively. The magnitude of the displacements can be related to the height of the body 26 at each interrupt point and the direction is fixed by the geometry of the optical system. In this way a head and shoulders profile can be deduced from the displacements.

To determine the magnitude of the displacements the origin points on the bright line 50 have to be known. This can be excessively complicated by obstruction of the line of sight between the camera 22 and body 26 by other bodies as they pass along the corridor 12. Each displacement direction 56a, 56b, 56c, 56d has two components: one parallel to and one perpendicular to the bright line 50. The perpendicular component is straightforward to measure; the undisplaced line 50 can be extrapolated from its uninterrupted sections. In this construction, the relevant portion of the light sheet 18 appears to be displaced outwards from the symmetry line 40 by a perpendicular distance given by $$d_{shift\perp} fd_\perp \frac{h_{body}}{h_c(h_c - h_{body})} \quad (2)$$

where $d_\perp$ is the perpendicular distance from the camera 22 to the light sheet 18.

Thus, a body 26 passing through the first light sheet 18 will cause a real time displacement 64 of the bright line 66 as observed by a downward-looking camera 22 whose field of view encompasses the light sheet 18 and floor 16 intersection. The displacement pattern will be dependent on the height variation over the head and shoulders of the body 26.

The camera 22 detects deflections of both light sheets 18, 20. Consider the expected case of a person walking along the corridor 12 and thereby interrupting first one and then the other light sheet 18, 20. Deflection patterns 64 extending outwards from the image centre are thus observed when the body 26 interrupts sequentially each individual light sheet 18, 20. From the order of light sheet displacements the direction of travel of the body 26 can be determined. The use of multiple light sheets provides the direction determining capability of the invention. In applications for which there is no need to determine the direction of traffic flow, for example, an intruder alarm and road surface monitoring system described later, a single light sheet can be used.

In an alternative embodiment of the invention the single camera 22 is replaced by a number of cameras arrayed along the symmetry line 25 of the ceiling. A single camera places extreme requirements on the width of its field of view. To function effectively the field of view must encompass the entire width of the light sheet at the level of a typical body height i.e. of order 3 m at a distance of 0.6 m. This basically requires a single camera to possess a very wide field of view. Multiple cameras allow the invention to cover the entire width of the light sheets with reduced field-of-view cameras. The problem of obscuration by one body of a second more distant body is also likely to arise more frequently when only one line of sight is available to a single camera. The multiple views afforded by a number of cameras can significantly reduce counting errors arising from this source.

The two light sheets 18, 20 may be formed in a number of ways. Ideally strip sources are located in the ceiling 14 to provide for downwards light propagation across the entire width of the corridor 12. As an alternative, each sheet 18, 20 is formed by at least one laterally fanned beam which is collimated in the longitudinal direction. Fanning in the lateral direction is achieved by a cylindrical lens. A further embodiment is provided by multiple point sources fanned to a lesser extent in the lateral direction and collimated in the longitudinal direction. The longitudinal collimation of these embodiments is not critical. Good results are achieved if the light sheets 18, 20 are relatively narrow at the typical height of the bodies'of the order 5 mm or smaller—although standard image signal processing techniques can be used to find the centre line of a wider imaged beam.

In a further embodiment, fanning is neglected entirely and a one-dimensional array of collimated beams employed. The bright lines 50, 66 of the images shown in FIGS. 3 and 4 will then be replaced by a series of bright dots. The spacing between each beam of the array should be small enough to prevent intruders by-passing the light detection system. The image signal processing problem can be simplified with this embodiment because the locus of deflection of each dot is known (i.e. radially outward from the zero deflection point with origin at the image central point 54). Thus only a limited number of pixels need to be searched in locating each dot. For this reason an array embodiment may be preferred over a sheet beam implementation. This embodiment may also be favoured if it is necessary or desirable to use a less intense light source which precludes fanning.

Figure 5:
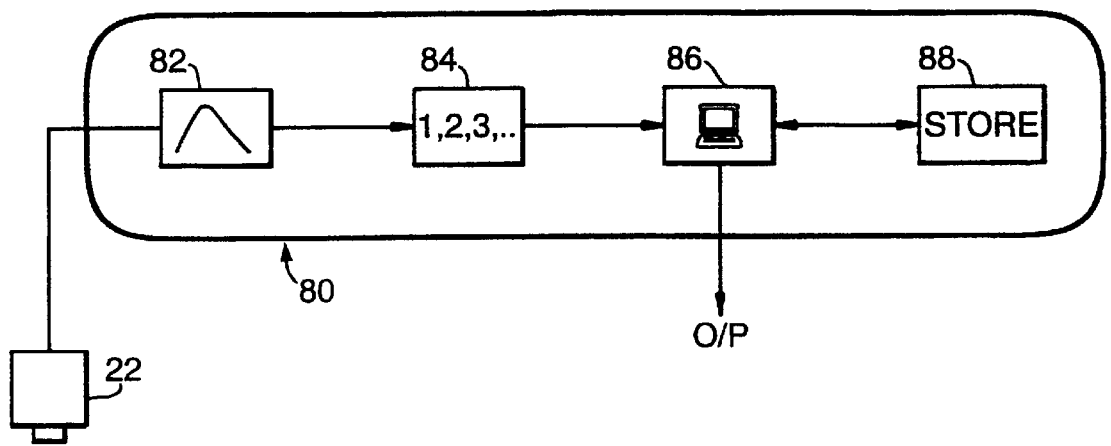
FIG. 5 is a representation of a data processing system for use in the invention.
Figure 6:
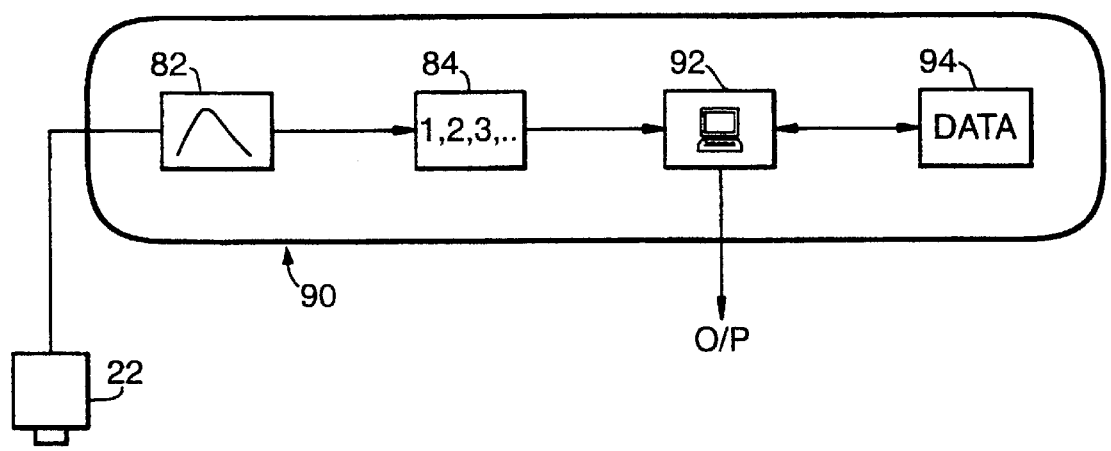
FIG. 6 is a representation of an alternative data processing system for use in the invention.

FIGS. 5 and 6 illustrate the camera 22 connected to a data processing system 80. The data processing system 80 is arranged to monitor and interpret the image observed by the camera 22.

FIG. 5 illustrates a first embodiment of the data processing system 80. The camera reading is input to an image processor 82 which records, processes and digitises the deflection pattern 64. A counting unit 84 is arranged to count the number of such deflection patterns occurring in each light sheet 18, 20. An interpreter 86 links disturbances from the same body 26 passing through both light sheets 18, 20 and thus derives direction of travel. A memory 88 provides the interpreter 86 with information about the numbers of people currently inside the restricted area.

FIG. 6 illustrates a second embodiment of the data processing system 90. Certain components of FIG. 6 perform the same functions as components of FIG. 5 and these are referenced similarly. The image output from the camera 22 is passed to an image processor 82 and counting unit 84. A second interpreter 92 receives a processed digitised image of the disturbance 64 and a signal from the counting unit 84. The interpreter 92 is further arranged to have access to a second memory 94 which contains digital images of head and shoulder deflection profiles 64. This second memory 94 is also arranged to keep an individual population record of numbers within the restricted site.

Referring once more to FIG. 5, the apparatus of this embodiment is arranged to keep a constant check on the number of persons within the restricted area guarded by the detection system of the invention 10. The interpreter 86 receives information from memory 88 detailing the current occupancy of the restricted area. A body entering the detection system 10 from a particular direction will initiate a count within the counting unit 84 indicating that a first light sheet 18, 20 has been disturbed. The interpreter 86 will look for the complementary count from the other light sheet 20, 18 as the body exits the detection system 10. Thus the interpreter 86 has knowledge of a body passing the detection system 10 and of the direction in which it travelled. The interpreter 86 then adjusts the number of persons in the restricted area accordingly, and updates the value stored in memory 88. The system is now prepared to count a second body passing through the detection system 10.

The image processor 82 is arranged to perform standard image processing functions. In any embodiment of the invention with multiple cameras aligned along the symmetry line 25 of the ceiling 14, the image processing includes a merger stage during which a single image of the deflection is produced from image overlaps when one body falls within the field of view of more than one camera.

The way in which the interpreter 86 associates two disturbances in different light sheets with the same travelling body 26 can be any one of a number of variants depending on the accuracy required. By way of example only, and not limiting the scope of the invention, some methods are illustrated below.

First, there need not be any particular association made at all. If a count is recorded at one light sheet 18, 20 then the first subsequent disturbance of the other light sheet 20, 18 is ignored and the body is assumed to be travelling in a direction from the first to the second light sheet. This arrangement will misassign situations in which the second light sheet is disturbed by a second person entering the detection system 10 before the first person exits. However the total number of people within the restricted area will only be wrong for the time between the measured exit and the true exit. This arrangement may be acceptably accurate if it can be certain that the camera 22 detects all disturbances to the light sheets 18, 20. It will have most use if approximate numbers are required from a high traffic flow at a roughly constant speed. The camera 22 will have to be adjusted such that the frame rate is sufficiently high for a fast passage of the beam to be detected as a disturbance and not averaged out in a single frame. The light sheet separation ($2d_1$) can be adjusted to approximately the distance travelled by the body 26 in one image frame of the camera. The body 26 will then be visible beneath the two light sheets 18, 20 during consecutive frames. This will allow determination of the direction of travel and if necessary approximate velocity. Assuming a maximum body velocity of 6 ms$^{-1}$, then a sheet separation of 0.25 m is the minimum which should be used with a typical camera frame rate of 25 Hz.

One method of association is based on an estimate of the average human walking speed. From this figure and an original disturbance at one light sheet 18, 20, the frame in which the associated disturbance of the other light sheet 20, 18 is expected to be observed is estimated: The interpreter 86 is arranged to recognise the actual disturbance of the second light sheet 20, 18 which is temporally closest to the expected disturbance. This actual detected disturbance is then assigned to be the associate of the original disturbance to the first light sheet 18, 20. Time limits can be set and if no actual disturbance to the second light sheet 20, 18 is detected during this limit then the camera 22 is assumed to have missed the exit from the system 10. This will give rise to inaccuracies as the camera 22 is equally likely to miss the entry to the detection system 10 as the exit and serious miscounts could result. However if heavy traffic is anticipated, then this may provide an inexpensive implementation of the invention.

A more accurate method of association is based on a process of pattern matching. In this embodiment, the deflection pattern 64 of a first light sheet 18, 20 is digitised by the image processor 82 and passed to the memory 88. In embodiments of the invention for which data reduction is necessary, the image processor 82 is also arranged to account for a disturbance being within the field of view of more than one camera. The interpreter 86 is then arranged to match the deflection patterns of the second sheet 20, 18 with those of the first sheet stored in the memory 88 and associate accordingly. In this way information about both the direction and the speed of travel can be extracted by the interpreter 86. The number of parameters used to register a match can be adjusted according to the accuracy and speed requirements of the application. Deflection patterns 64 can be matched statistically across the whole disturbance profile or simply to a single parameter such as maximum height of the interrupting body 26. In this embodiment it is necessary to have a sufficiently high camera frame rate in order to detect an acceptable majority of the light sheet disturbances.

Referring once more to FIG. 6, there is shown a second embodiment of the data processing system 90. In this arrangement the detection system 10 is designed to perform a more extensive process of pattern matching. This permits the resolution of individual head and shoulder profiles from overlapping disturbances and hence enables movements of large numbers of people into and out of the restricted area to be monitored. The image output from the camera 22 is passed to an image processor 82 and counting unit 84. An interpreter 92 receives a digitised image of the disturbance 64 and a signal from the counting unit 84. The interpreter 92 is further arranged to have access to a memory 94 which contains digital images of sample deflection profiles 64. The memory 94 is also arranged to keep a record of population within the restricted area.

In this embodiment multiple bodies pass together through the light sheets 18, 20. A single body 26 passing through a light sheet 18 causes a real-time disturbance of the associated bright line 66 of the image. The deflection pattern 64 is characteristic of a head and shoulders profile. If two well separated bodies pass simultaneously through the light sheet 18 then the bright line will exhibit two deflection patterns with readily discernible onset and completion which are easily resolved. However if one body is partly or completely behind the other then the two deflection patterns are not so readily separable. In this embodiment therefore, the image processor 82 records, processes and digitises a composite deflection profile 64 resulting from multiple bodies passing through a first light sheet. The interpreter 92 receives the digitised image and attempts to match it with a combination of individual deflection profiles stored within the memory 94. It also performs a statistical test on close-matching solutions to determine the best fit. The counting unit 84 then registers a count in accordance with the number of individuals deduced by the interpreter 92. This embodiment of the invention may be suitable for assessing attendance at sporting events at which the major traffic component flows in one direction only. Alternatively the direction of travel is determined by one of the techniques detailed for the processing system of FIG. 5.

The possibility has also been considered of using the interpreter 92 to identify certain individuals from their characteristic deflection profiles. This would involve installing a complete database of deflection profiles of all persons permitted access to the restricted site and setting the interpreter 92 to perform a pattern matching exercise. The level of pattern matching adopted is variable from a straightforward height classification to carrying out an extensive profile fit. If the match between an observed and expected deflection is outside a certain limit, no identification is made and a suitable intruder alarm is activated. If a good fit is registered then the observed deflection pattern is associated with the movement of the person identified as producing that fit. Such a system would have to be able to cope with the variety of postures adopted by a single person and the likely reduction of available image information due to obscuration.

The image processing can be performed more effectively if the camera 22 is focused correctly. The most important part of a body 26 seen by the camera 22 is the head and shoulder profile, particularly in embodiments for which pattern recognition is employed. It follows therefore that the camera 22 is arranged to focus on the typical height of the bodies—generally 0.6 m to 0.9 m from the camera 22.

Figure 7:
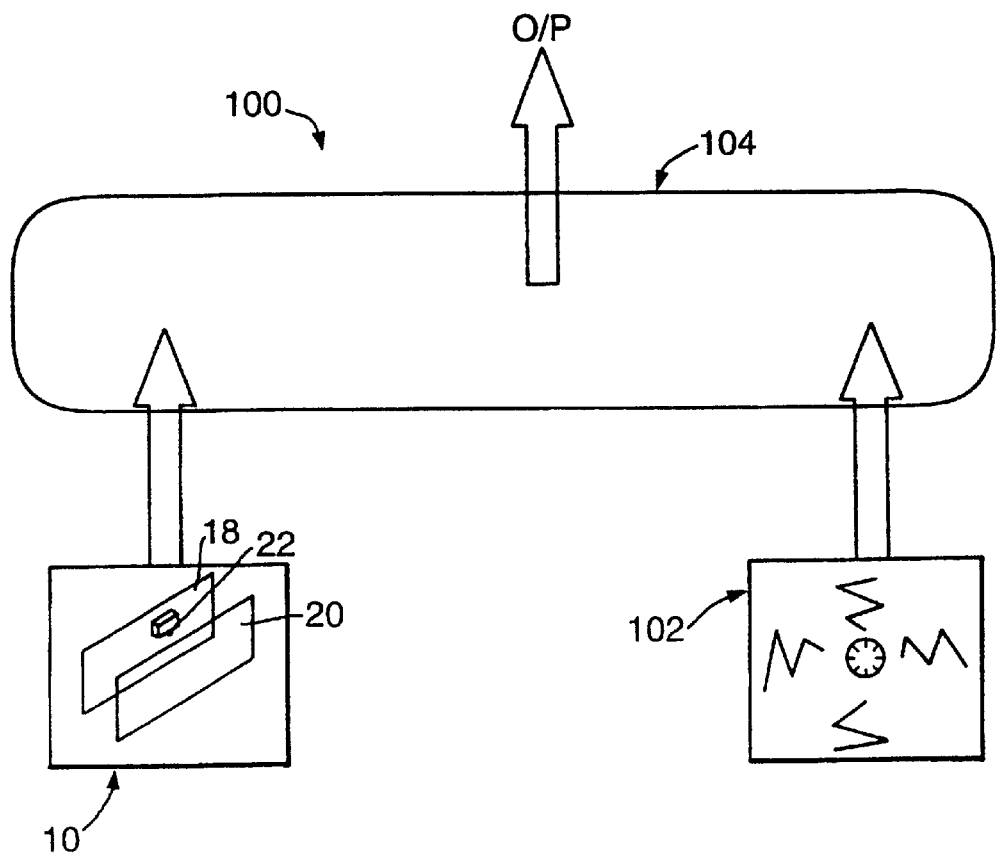
FIG. 7 is a schematic illustration of the detection system of the invention used in conjunction with a second detection system.

FIG. 7 illustrates a further embodiment 100 of the detection system of the invention 10. It incorporates a camera 22 arranged for light sheet observation as in the previous examples. In combination with this, a radio-frequency tagging detection system 102 is arranged to operate at the same location. The outputs from both detection systems are input to a digital processing system 104.

In the embodiment shown in FIG. 7, the detection system of the invention 10 is arranged to detect all persons passing through a corridor 12. A tagging detection system 102 is also arranged to acknowledge a person passing through the same corridor 12 only if they are wearing a particular tag identifier. Examples of radio-frequency tagging detection systems are known in the prior art and will not be described here. The digital processing system 104 will thus receive a signal from the detection system of the invention 10 if any body passes through. If the processing system 104 also receives a signal from the tagging detection system 102 then that body is allowed to pass freely. If, however, no signal is received from the tagging detection system 102 then the entry of an intruder is detected and a suitable alert issued.

Figure 8:
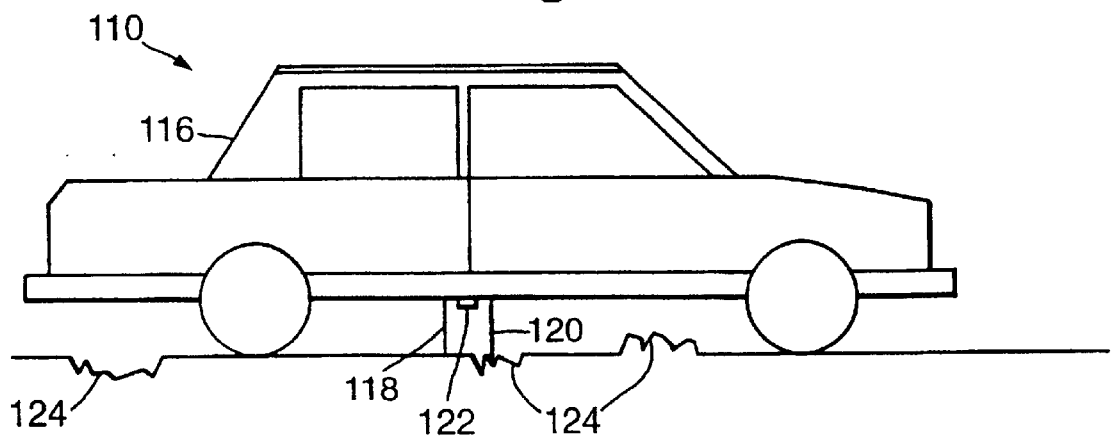
FIG. 8 is a schematic illustration of an application of the invention to road surface mapping.

FIG. 8 illustrates a second implementation of the detection system of the invention 110. Light sheets 118, 120 are generated from sources attached to the underside of a road vehicle 116. As before, a camera 122 is located midway between these light sheets 118, 120 and also attached to the underside of the vehicle 116. The vehicle 116 is driven along a road surface marked with potholes and similar road irregularities 124.

The vehicle 116 with the attached detection system is driven along the road. Whenever a light sheet 118, 120 intersects with an irregularity 124 in the road surface a deflection of a bright line in the image occurs as described earlier. The deflection profile is indicative of the shape and depth or height of the irregularity 124. Data processing equipment can be stored within the road vehicle 116 in order to provide a readily assessable interpretation of the image variations. A second light sheet 120 in this implementation is optional given that the direction of vehicle motion is known. The data gathered can however be used to gain a more accurate picture of the interrupting irregularity 124. The invention can thus be used to rapidly map and assess road surfaces for repair.

A further application of the detection system of the invention is in recognising the orientation of objects on a conveyor belt or production line. The light sheets are projected onto the conveyor belt and the intersections imaged by an appropriately placed camera. The transverse height profile can be determined from each single-frame deflection pattern and the longitudinal profile from the change in deflection pattern across sequential frames. Objects correctly oriented will give rise to a characteristic series of deflection patterns as they pass through the intersections on the conveyor belt. Misaligned objects can then be detected by their unexpected deflection patterns and reoriented.

Theoretically there are no reasons per se for restricting the light forming the light sheets to a particular wavelength. However, the application to which the invention is put may favour a particular spectral range over others. The invention uses an active optical signal and relies on a good signal to noise ratio from the projected light beam striking the object beneath. This requires strong contrast and minimising the effects of ambient lighting is important. Furthermore in the body counting implementation it is advantageous to have inobtrusive lighting which effectively excludes the visible spectrum from consideration. Strong contrast in a corridor of a building is achieved by using narrow spectral response short-wave infrared (sub 1 $\mu$m) radiation generated by solid state photoemitters. This wavelength range is detected by silicon CCD cameras, with enhanced red response if necessary. The camera is narrow-band filtered to the wavelength of the emitter in order to reduce the energy detected from background lighting.

What is claimed is:

1. A detection system for detecting movement of an object relative to the system, said system comprising:

a light source for projecting light in a projection direction to form an intersection with an obstructing surface, the intersection extending across a detection zone of the system and comprising a line of light which is one of a continuous line of light and a line defined by a series of separate regions of light;

imaging apparatus comprising at least one camera for providing an image of the intersection of said light with the obstructing surface, the imaging apparatus:

responsive to said light, having an optical axis which is offset from the projection direction, producing a line image of a profile of the intersection of the projected light with the obstructing surface in an image plane of the camera, and where at least part of the obstructing surface is not that of a reference surface, at least part of its imaged profile is displaced in the image plane relative to an image position corresponding to intersection of projected light with the reference surface;

image processing apparatus, said image processing apparatus:
  responsive to deflection of the imaged profile of the light intersection caused by relative movement of an object through the detection zone providing a change of obstructing surface position, and
  detecting a line image deflection pattern produced by the obstructing surface profile relative to image deflection produced by at least one elongate reference profile; and
  the deflection pattern comprising in perpendicular displacements ($d_{shift\ \perp}$) of line image components in a line image of the obstructing surface profile from positions of corresponding line image components in a reference line image, said displacements being described at the imaging apparatus' image plane by an equation as follows:

$$d_{shift\perp} = fd_\perp \frac{h_{body}}{h_c(h_c - h_{body})}$$

where $d_1$ is the perpendicular distance from the imaging apparatus to a light sheet associated with the line image of the obstructing surface profile, $f$ is the focal length of the imaging apparatus, $h_C$ is the distance between the imaging apparatus and the bounding surface and $h_{body}$ is a parameter indicating the body surface's distance from the reference surface at each point that it intersects the light sheet.

2. A detection system for detecting movement of objects relative to the system, said system comprising:
  a light source for projecting at least one substantially planar sheet of light in a projection direction to form an intersection with an obstructing surface, the intersection extending across a detection zone of the system and comprising at least one line of light which is one of a continuous line of light and a line defined by a series of separate regions of light;
  imaging apparatus comprising at least one camera for providing an image of the intersection of said light with the obstructing surface, the imaging apparatus:
    responsive to said light,
    having an optical axis which is offset from the projection direction,
    producing a line image of a profile of the intersection of the projected light with the obstructing surface in an image plane of the camera, and
    where at least part of the obstructing surface is not that of a reference surface, at least part of its imaged profile is displaced in the image plane relative to an image position corresponding to intersection of projected light with the reference surface;
    where for each projected light sheet, in the absence of an interrupting object, the reference surface providing an obstructing surface and the line image is located in a first position in the image; and for each projected light sheet, in the presence of a number of objects interrupting the light sheet, the combined surfaces of the objects and any intermediate regions of the reference surface providing an obstructing surface and a line image associated with the interrupted light sheet exhibiting a multiple-object deflection pattern characteristic of profiles of objects passing through the light sheet: and
  image processing apparatus:
    responsive to deflection of the imaged profile of the light intersection caused by relative movement of an object through the detection zone providing a change of obstructing surface position,
    detecting a line image deflection pattern produced by the obstructing surface profile relative to image deflection produced by at least one elongate reference profile, and
    comparing the multiple-object deflection pattern with stored deflection patterns, each stored deflection pattern being characteristic of a single object, and thereby is capable of resolving the multiple-object deflection pattern into a number of overlapping single-object deflection patterns.

3. A detection system for detecting movement of objects relative to the system, said system comprising:
  a light source for projecting two substantially planar sheets of light in a projection direction to form intersections with an obstructing surface, the intersections extending across a detection zone of the system and comprising two lines of light, each line of light comprised of continuous line of light and a line defined by a series of separate regions of light;
  imaging apparatus comprising at least one camera for providing an image of the intersection of projected light from the light source with the obstructing surface, the imaging apparatus:
    responsive to projected light,
    having an optical axis which is offset from the projection direction,
    producing a line image of a profile of the intersection of the projected light with the obstructing surface in an image plane of the camera, and
    where at least part of the obstructing surface is not that of a reference surface, at least part of its imaged profile is displaced in the image plane relative to an image position corresponding to intersection of projected light with the reference surface;
    for each projected light sheet interrupted by a number of objects, the combined surfaces of the objects and any intermediate regions of the reference surface forming the obstructing surface and the line image associated with the interrupted light sheet exhibiting a multiple-object deflection pattern characteristic of profiles of objects passing through the light sheet; and
  image processing apparatus:
    responsive to deflection of projected light intersections caused by relative movement of objects through the detection zone providing a change of obstructing surface position, and
    detecting a line image deflection pattern produced by the obstructing surface profile relative to image deflection produced by at least one elongate reference profile;
    comparing the multiple-object deflection pattern with stored deflection patterns, each stored deflection pattern being characteristic of a single object, and the image processing apparatus thereby being capable of resolving the multiple-object deflection pattern into a number of overlapping single-object deflection patterns; and monitoring population within a designated area in accordance with number of objects passing through the system, to deduce direction of travel by association of deflections of different image lines, and resolve single-object deflection patterns from multiple-object deflection patterns for deriving the number of objects passing through a light sheet and therefore entering or leaving the designated area.

* * * * *